(12) United States Patent　　　(10) Patent No.:　　US 12,601,389 B2
　　Pan et al.　　　　　　　　　　(45) Date of Patent:　　　Apr. 14, 2026

(54) PNEUMATIC-LIQUID AUTO-BALANCE ACTUATOR WITH LARGE DIAMETER

(71) Applicant: BEIJING UNIVERSITY OF CHEMICAL TECHNOLOGY, Beijing (CN)

(72) Inventors: Xin Pan, Beijing (CN); Dehong Ge, Beijing (CN); Haiqi Wu, Beijing (CN); Jinji Gao, Beijing (CN); Zhinong Jiang, Beijing (CN)

(73) Assignee: BEIJING UNIVERSITY OF TECHNOLOGY, Beijing (CN)

( * ) Notice: Subject to any disclaimer, the term of this patent is extended or adjusted under 35 U.S.C. 154(b) by 24 days.

(21) Appl. No.: 18/811,744

(22) Filed: Aug. 21, 2024

(65) Prior Publication Data

US 2024/0410443 A1　　Dec. 12, 2024

Related U.S. Application Data

(63) Continuation of application No. PCT/CN2023/073846, filed on Jan. 30, 2023.

(30) Foreign Application Priority Data

Feb. 24, 2022　(CN) .......................... 202210172594.9

(51) Int. Cl.
　　F16F 15/36　　　　(2006.01)
(52) U.S. Cl.
　　CPC ................................. F16F 15/366 (2013.01)
(58) Field of Classification Search
　　CPC ....................................................... F16F 15/366
　　See application file for complete search history.

(56) References Cited

FOREIGN PATENT DOCUMENTS

| CN | 102840949 | 12/2012 | |
| CN | 103874868 | 6/2014 | |
| CN | 106090120 | 11/2016 | |
| CN | 106090120 A | * 11/2016 | ............ F16F 15/167 |
| CN | 114576310 | 6/2022 | |
| CN | 114576310 A | * 6/2022 | .............. F16F 15/36 |
| CN | 115355282 | 11/2022 | |

OTHER PUBLICATIONS

"International Search Report (Form PCT/ISA/210) of PCT/CN2023/073846," mailed on May 7, 2023, with English translation thereof, pp. 1-8.

* cited by examiner

*Primary Examiner* — Vicky A Johnson
(74) *Attorney, Agent, or Firm* — JC ONE WORLD

(57)　　　　　　ABSTRACT

The present application provides a pneumatic-liquid auto-balance actuator with a large diameter. An intermediate sleeve is interference-sheathed on an outer side wall of a liquid storage tray. An outer side wall of the intermediate sleeve is axially provided with four gas circulation grooves. The bottom of a stator is axially provided with four gas injection channels, which are of unequal depths and are in one-to-one correspondence to the gas circulation grooves. The liquid storage tray comprises four liquid storage cavities uniformly distributed in a circumferential direction. Gas injection pipes are arranged in the liquid storage cavities and are in communication with and connected to the gas circulation grooves. A communication pipe is in communication and connected between the liquid storage cavities which are provided opposite each other.

10 Claims, 9 Drawing Sheets

PNEUMATIC-LIQUID AUTO-BALANCE ACTUATOR WITH LARGE DIAMETER

CROSS-REFERENCE TO RELATED APPLICATIONS

This application is a continuation of international PCT application serial no. PCT/CN2023/073846, filed on Jan. 30, 2023, which claims the priority benefit of China application no. 202210172594.9, filed on Feb. 24, 2022. The entirety of each of the above mentioned patent applications is hereby incorporated by reference herein and made a part of this specification.

TECHNICAL FIELD

The present application relates to the field of intelligent vibration control technology for rotary apparatus, in particular, it relates to a pneumatic-liquid auto-balance actuator with a large diameter.

DESCRIPTION OF RELATED ART

With the development of related technologies of "Industry 4.0" and "Made in China 2025", intelligent equipment with the functions of state monitoring, vibration control and self-maintenance of health status will be greatly developed in the field of intelligent manufacturing. Rotor imbalance is the main cause of equipment failure caused by excessive rotor vibration of rotating apparatus, which seriously affects the operating conditions and production efficiency of rotating apparatus, and may lead to safety accidents in severe cases. On-line automatic balancing device can inhibit the rotor imbalance vibration in real-time during the operation of equipment, which plays an important role in ensuring the long-term safe and stable operation of equipment and improving the intelligent level of equipment. The on-line automatic balancing system includes: sensors, measurement and control devices, actuators, accessories, etc. The fundamental principle is as follows: a balancing actuator that rotates synchronously with the rotor is mounted on the rotating apparatus in advance; in the operation process of the apparatus, the sensor acquires the rotation state parameters of the rotating apparatus in real time, and inputs the signals into the measurement and control device. When it is monitored that the imbalance vibration exceeds the standard, the measurement and control device sends out the instruction to form the compensation vector by changing the mass distribution inside the actuator on line to inhibit the imbalance vibration of the rotating apparatus in real time.

The liquid type auto-balance actuator is a common on-line auto-balance device. There are multiple liquid storage cavities inside the actuator. By injecting or discharging a certain amount of liquid in one or several liquid storage cavities, the mass inside the actuator is redistributed to offset the previous imbalance. The auto-balance actuator has the advantages of simple structure, high precision and environment-friendly.

At present, the liquid type auto-balance actuator mainly has the following forms:

(1) Liquid-injecting type auto-balance actuator: by controlling the opening and closing of the electromagnetic valve, a certain liquid is injected from a nozzle into the balance actuator to form a compensation vector equal in magnitude and opposite in direction to the imbalance vector. (2) Liquid-releasing type auto-balance actuator: the liquid storage cavity is filled with balance liquid in advance, the electromagnetic valve is mounted into the liquid chamber, the electromagnetic valve is opened during balance, and a certain amount of liquid is discharged to eliminate the previous imbalance. (3) Liquid-injecting-discharging type auto-balance actuator: by precisely controlling the amount of injected liquid and analyzing the amount of discharged liquid, the dynamic balance of injected and discharged liquid is realized to determine the amount of remaining liquid in the final liquid chamber and to realize dynamic balance. (4) Liquid-transferring type auto-balance actuator: a certain balance liquid is pre-injected into the liquid storage cavity of the actuator, and the initial imbalance amount is balanced by transferring fluid from adjacent or opposing liquid storage cavities mutually.

For the liquid-injecting type auto-balance actuator and the liquid-releasing type auto-balance actuator, as the number of balance increases, the balance capacity decreases, and finally the actuator loses the balance capacity due to no space for liquid injection or discharge in the liquid storage cavity, thus the requirements for continuous operation cannot be achieved. The continuous liquid-injecting-discharging type auto-balance actuator solves the problem that the liquid-injecting-type and the liquid-releasing type auto-balance actuator lose the regulating ability due to the liquid filling or evacuation, but the discharged liquid is not controllable and the accuracy of the actuator is affected. In addition, the above-mentioned three actuators all have the problem that the previous balance state cannot be maintained after shutdown. The liquid-transferring type auto-balance actuator can not only get rid of the process of injection and discharging, but also maintain the balance state after shutdown. At present, the liquid transfer methods include heating evaporation medium transfer, adding a pump and other components inside the actuator for liquid transfer and an external pneumatic device for medium transfer. Heating the evaporation medium places high demands on the temperature and the amount of medium transfer and the balancing speed is affected, and adding movable parts inside the actuator greatly reduces the reliability of the actuator.

For the liquid-transferring type auto-balance actuator, the prior art patents CN102840949A, CN103874868A and CN106090120A are all involved; however, for the application situation of auto-balance of a large rotary apparatus, the actuator needs to have sufficient balance capacity and a suitable structural form, and no relevant report has been found at present.

Therefore, it is necessary to provide a pneumatic-liquid auto-balance actuator with a large diameter, which is designed based on the structural basis of a pneumatic-liquid auto-balance actuator, so as to expand the application range of pneumatic-liquid auto-balance actuators. The balance capacity of the pneumatic-liquid auto-balance actuator is related to the diameter of the position where the liquid storage cavity is located, and has sufficient balance capacity corresponding to the large diameter rotor.

SUMMARY

In view of this, it is an object of the present application to provide a pneumatic-liquid auto-balance actuator with a large diameter, which is mounted without destroying the integrity of the large diameter rotor to be balanced and the apparatus, has sufficient and lasting balancing capability for the large diameter rotor, and ensures the reliability of the automatic balancing process.

In order to solve the above technical problem, the present application adopts the following technical solutions:

a pneumatic-liquid auto-balance actuator with a large diameter, which includes a stator and a balance disk, where the stator and a bearing are fixedly provided on a base, the bearing supports a rotor to be balanced, the balance disk is fixedly provided outside the rotor to be balanced and rotates synchronously with the rotor to be balanced, and the stator is provided outside the balance disk. The stator is fixedly provided on the base of the apparatus by means of bolts, the balance disk is connected to the rotor to be balanced by means of bolts, and there is a certain clearance between the balance disk and the stator in the radial direction. The base acts as a bearing for fixing the stator and the rotor to be balanced, the bearing acting as a support.

The balance disk includes an intermediate sleeve, a liquid storage tray and a shield, where the intermediate sleeve is interference-sheathed on an outer side wall of a liquid storage tray, an outer side wall of the intermediate sleeve is axially provided with four gas circulation grooves, the liquid storage tray includes four liquid storage cavities which are uniformly distributed along a circumferential direction, an equal amount of balance liquid is initially provided in each of the liquid storage cavities, gas injection pipes are provided in the liquid storage cavities and are respectively fixedly provided on outer side walls of the liquid storage cavities and are inserted into inner side walls of the liquid storage cavities, and the gas injection pipes are in communication and connected with the gas circulation grooves. The intermediate sleeve is thermally sheathed on the liquid storage tray after the processing is completed, and is assembled into one body through the thermal sheathing.

A communication pipe is in communication and connected between the liquid storage cavity and another liquid storage cavity provided opposite thereto, an evacuation pipe is in communication and connected with the middle of the communication pipe, one end of the evacuation pipe is fixedly provided on a bottom surface of the liquid storage tray, the other end of the evacuation pipe is in communication with the atmosphere, the middle of the evacuation pipe is in communication and connected with the communication pipe, the communication pipe and an exhaust pipe are provided in a shield, and the shield is fixedly provided on the liquid storage tray. The communication pipe serves as a fluid channel for the transfer of the balance liquid, and the evacuation pipe serves to balance the pressure of two liquid storage cavities connected to the communication pipe so that it is equal to the external atmospheric pressure under the non-action state of the pneumatic-liquid balance actuator, so as to avoid that the pressure in a certain liquid storage cavity is greater than the atmospheric pressure due to multiple gas injection for balance, thus affecting the transfer of the balance liquid and thus affecting the balance effect. The shield is bolted to the liquid storage tray and functions to protect the communication pipe and the exhaust pipe from damage.

Preferably, four gas injection channels of different depths are axially provided at the bottom of the stator, and the gas injection channels are in one-to-one correspondence to the gas circulation grooves of the outer side wall of the intermediate sleeve; and gas circuit channels are respectively connected outside the gas injection channels, and the gas circuit channels are respectively in communication and connected with a gas source via electromagnetic valves. The intermediate sleeve is a dynamic-static transfer part to realize compressed gas injection from the stationary gas injection channel on the stator to the internal liquid storage cavity of the liquid storage tray rotating synchronously with the rotor to be balanced.

Further, the gas injection pipe is provided at a central position in an axial direction and a circumferential direction of the liquid storage cavity, an outer surface of the outer wall of the liquid storage cavity is provided with an oblong groove, one end of the oblong groove is connected to a bottom wall of the gas circulation groove, and the other end of the oblong groove is connected to the top of the gas injection pipe. This arrangement of the gas injection pipe makes the intake process more uniform, and the parameters such as the transfer speed in the liquid transfer process are consistent, but since the introduction of the gas from the gas circulation groove into the gas injection pipe through the oblong groove increases the local resistance, such a configuration is suitable if the sealing requirement is low or the intake gas amount is demanded to be small.

The gas provided by the gas source passes through four electromagnetic valves and then passes through four gas circuit channels and corresponding four gas injection channels with different depths on the stator; the four gas injection channels respectively correspond to four gas circulation grooves on the intermediate sleeve along the axial depth; the oblong grooves at the bottoms of the four gas circulation grooves respectively correspond to four gas injection pipes in the four liquid storage cavities, forming four mutually independent gas circulation channels, i.e., the gas enters the four liquid storage cavities respectively through the oblong grooves at the bottoms of the gas circulation grooves of the intermediate sleeve and the gas injection pipes.

Further, gas labyrinth seal grooves are provided between the gas circulation grooves. The gas labyrinth seal groove divides the gas circulation groove on the outer side wall of the intermediate sleeve into independent gas channels which do not affect each other, so that the gases between the respective gas circulation grooves are mutually independent and do not affect each other.

In another preferred manner, four pairs of gas inlets are provided on an outer side wall of the stator, the axial positions of each pair of the gas inlets are the same and are centrally symmetrical around a rotating shaft, and each pair of the gas inlets are in one-to-one correspondence to the gas circulation grooves of the outer side wall of the intermediate sleeve; and gas circuit channels are respectively connected outside the gas inlets, and the gas circuit channels are respectively in communication and connected with a gas source via electromagnetic valves.

Further, the gas injection pipe is provided at a circumferential center of the liquid storage cavity and axially at a position corresponding to the gas circulation groove, and a through hole corresponding to the gas injection pipe is provided at the bottom of the gas circulation groove. This arrangement of the gas injection pipe adopts a structure in which the gas circulation groove is in direct communication with the gas injection pipe, which improves the gas injection effect and reduces the local resistance caused by the oblong groove structure. It is applicable to the case where the intake gas amount is demanded to be great, and the intake effect can be greatly increased.

The gas provided by the gas source passes through four electromagnetic valves and then passes through four gas circuit channels and corresponding four pairs of gas inlets of the stator; the four pairs of gas inlets respectively correspond to four gas circulation grooves on the intermediate sleeve; the oblong grooves at the bottoms of the four gas circulation grooves respectively correspond to four gas injection pipes in the four liquid storage cavities, forming four mutually independent gas circulation channels, i.e., the gas enters the four liquid storage cavities respectively through the oblong grooves at the bottoms of the gas circulation grooves of the intermediate sleeve and the gas injection pipes.

Further, brush type sealing means are provided on both sides of the gas circulation groove, the brush type sealing means including a front plate, a rear plate and a brush tow. The brush type sealing means is welded on the inner side of the stator in four pairs, two in each pair, correspondingly mounted at two sides of the four gas circulation grooves on the intermediate sleeve. The brush type sealing means divides the gas circulation groove on the outer side wall of the intermediate sleeve into independent gas channels which do not affect each other, so that the gases between the respective gas circulation grooves are mutually independent and do not affect each other.

Specifically, the liquid storage tray includes a first liquid storage cavity, a second liquid storage cavity, a third liquid storage cavity and a fourth liquid storage cavity which are uniformly distributed and successively provided, a first communication pipe is in communication and connected between the first liquid storage cavity and the third liquid storage cavity, and a second communication pipe is in communication and connected between the second liquid storage cavity and the fourth liquid storage cavity; a first evacuation pipe is in communication and connected with the middle of the first communication pipe, and a second evacuation pipe is in communication and connected with the middle of the second communication pipe.

Specifically, the bottom of the stator is axially provided with a first gas injection channel, a second gas injection channel, a third gas injection channel and a fourth gas injection channel with different depths, where the first gas injection channel, the second gas injection channel, the third gas injection channel and the fourth gas injection channel respectively are in one-to-one correspondence to the four gas circulation grooves of the outer side wall of the intermediate sleeve.

Specifically, a first gas inlet, a second gas inlet, a third gas inlet and a fourth gas inlet are provided on the outer side wall of the stator, each pair of the first gas inlets, the second gas inlets, the third gas inlets and the fourth gas inlets having the same axial position and being centrally symmetrical around the rotating shaft, and each pair of the first gas inlets, the second gas inlets, the third gas inlets and the fourth gas inlets are in one-to-one correspondence to the gas circulation grooves of the outer side wall of the intermediate sleeve.

A certain amount of balance liquid is pre-stored in each of the four liquid storage cavities on the liquid storage tray, a communication pipe is in communication and connected between the liquid storage cavity and another liquid storage cavity provided opposite thereto, an evacuation pipe is in communication and connected to the middle of the communication pipe, compressed gas provided by a gas source can enter the corresponding liquid storage cavity through any one of the above-mentioned four gas injection channels, and the balance liquid pre-stored in the liquid storage cavity is driven to be transferred to the opposite liquid storage cavity along the corresponding communication pipe; in addition, gases can be respectively injected into adjacent cavities at the same time, and the balance liquids of two adjacent liquid storage cavities are driven to be transferred to the opposite liquid storage cavity at the same time. In this process, the amount of balance liquid needed to be transferred can be calculated by vector synthesis, and then the amount of injected gas can be controlled by controlling the on-off time of electromagnetic valve to determine the amount of balance liquid to be transferred, realize the mass redistribution of actuator and complete the auto-balance.

The pneumatic-liquid auto-balance actuator with a large diameter of the present application maintains the dynamic balancing process of a rotor to be balanced:

When the rotor to be balanced is working, a vibration signal and a rotation speed signal of the rotor to be balanced are obtained in real time by means of a vibration sensor mounted on a bearing of an end of the rotor to be balanced close to an actuator and a rotation speed sensor on the outer side of the rotor to be balanced, and are input to the controller. The measurement and control device analyzes the vibration signal and the rotation speed signal, and when the vibration of the rotor to be balanced exceeds the standard, obtains the magnitude and phase of the imbalance amount of the rotor to be balanced, calculates the direction and amount of the balance liquid to be transferred in the liquid storage cavity, calculates the required on-off time of the electromagnetic valves corresponding to two certain adjacent liquid storage cavities through a corresponding algorithm, and outputs a control signal. The electromagnetic valve receives a control signal, so that the compressed gas in the gas source passes through the above-mentioned mutually independent gas injection channels to drive the balance liquids in the adjacent liquid storage cavities to transfer to the opposite liquid storage cavity, so that the mass of the balance disk of the actuator is redistributed, until the vibration of the rotor to be balanced returns to a normal level, and the dynamic balancing process ends.

Advantageous effects of the present application are as follows:

In the present application, due to the use of the above-mentioned technical solution, during an operation process, there is no liquid injection and liquid discharging steps, the on-off time of the electromagnetic valves is controlled by a measurement and control device, and compressed gas is injected to drive balance liquids of a fixed amount to be mutually transferred between the opposite liquid storage cavities, and two pairs of mutually orthogonal liquid storage cavities obtain by vector synthesis a compensation vector equal in magnitude and opposite in direction to the imbalance amount to offset the imbalance.

Compared with the current liquid-injecting type dynamic balance actuator, the pneumatic-liquid auto-balance actuator has no liquid injection and liquid discharging processes, and it has permanent balance ability. In the balance process, the amount of balance liquid to be transferred is determined, and the gas injection time is determined according to the on-off time of the electromagnetic valve, so that the balance process can be controlled without multi-step adjustment, and the balance accuracy and efficiency are greatly improved.

Compared with the current liquid-injecting type, liquid-releasing type, liquid-injecting-discharging type dynamic balance actuator, the pneumatic-liquid auto-balance actuator needs no liquid injection and liquid discharging. The mass redistribution of actuator is realized by transferring liquid. After shutdown, the balance liquid in each liquid storage cavity keeps the state before shutdown, which not only overcomes the problem of unable to maintain balance state, but also is environmentally friendly.

Compared with the current liquid-transferring type auto-balance actuator in which evaporation medium is heated and the pump is added, the pneumatic-liquid auto-balance actuator drives the balance liquid in the liquid storage cavity to transfer through compressed gas, which in practice has wide gas sources, is not limited by the complex environment of the factory, and has no movable part therein. The overall structure is simple and reliable.

Compared with the patents CN102840949A, CN103874868A and CN106090120A, the pneumatic-liquid auto-balance actuator is sheathed on the outside of the rotor with a large diameter to be balanced, and the balancing capacity of the actuator is proportional to the diameter of the actuator. It is more difficult for large diameter rotors to be sealed circumferentially and transfer gas pressure than small-diameter rotors such as grinding wheels. The combination of gas circulation groove and gas injection channel between the stator and the intermediate sleeve of balance disk of the pneumatic-liquid auto-balance actuator improves the efficiency of compressed gas dynamic-static transfer, and the pneumatic-liquid auto-balance actuator can meet the on-line auto-balance of large diameter rotors by increasing the diameter of gas injection pipe or gas injection pressure.

The above description is only a general description of the technical solutions of the present application, and in order to enable the technical means of the present application to be more clearly understood and implemented according to the contents of the description, at the same time, in order to make the above and other objects, technical features and advantages of the present application more understandable, one or more preferred embodiments are listed below, and are described in detail with reference to the accompanying drawings.

BRIEF DESCRIPTION OF THE DRAWINGS

One or more embodiments are illustrated by way of example and not by way of limitation in conjunction with the figures of the accompanying drawings, in which elements having the same reference numeral designations represent similar elements, and in which the figures are not to scale unless otherwise specified.

8

DESCRIPTION OF SIGNIFICANT REFERENCE NUMERALS

Figure 1:
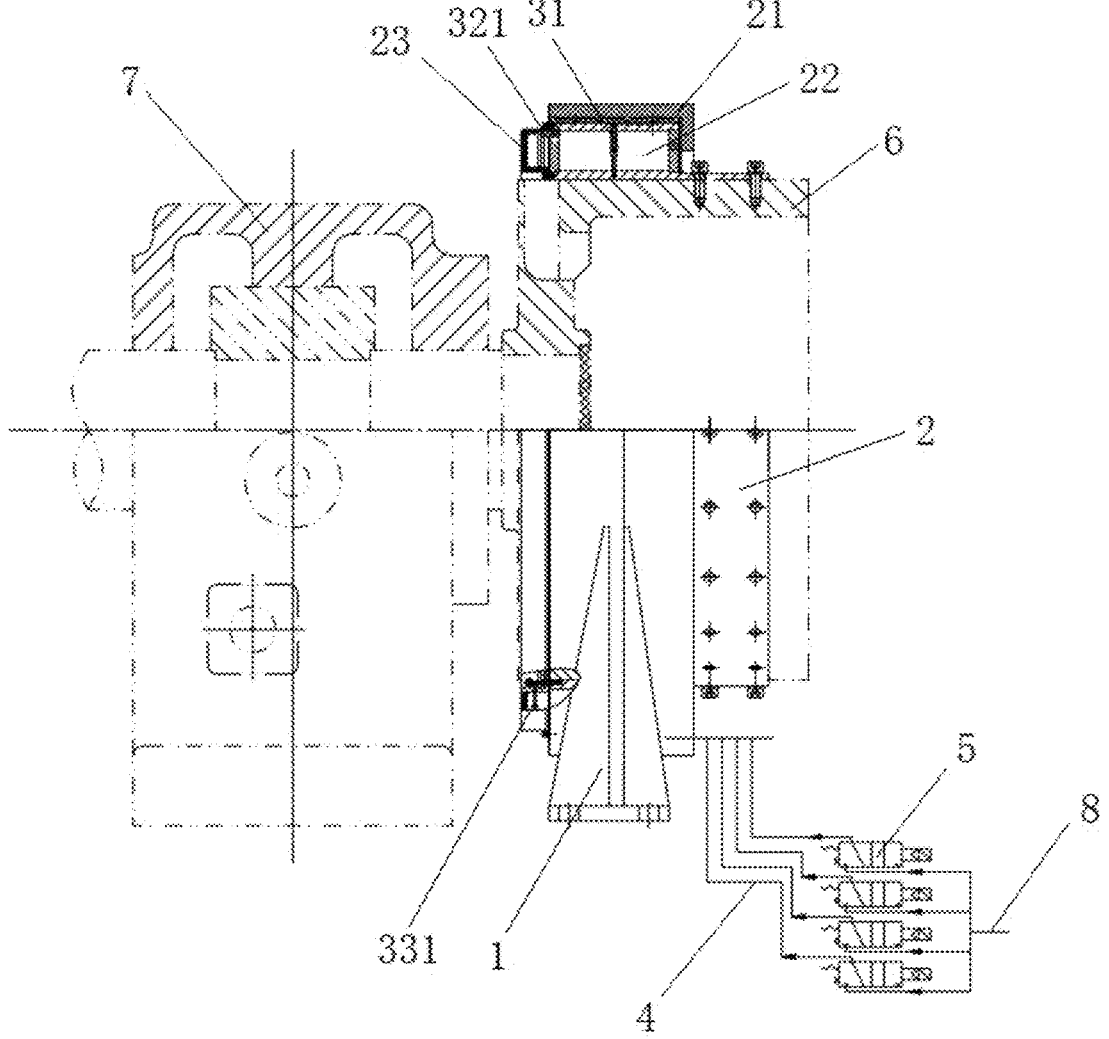
FIG. 1 is a schematic structural diagram showing embodiment I of a pneumatic-liquid auto-balance actuator with a large diameter according to the present application.
Figure 2:
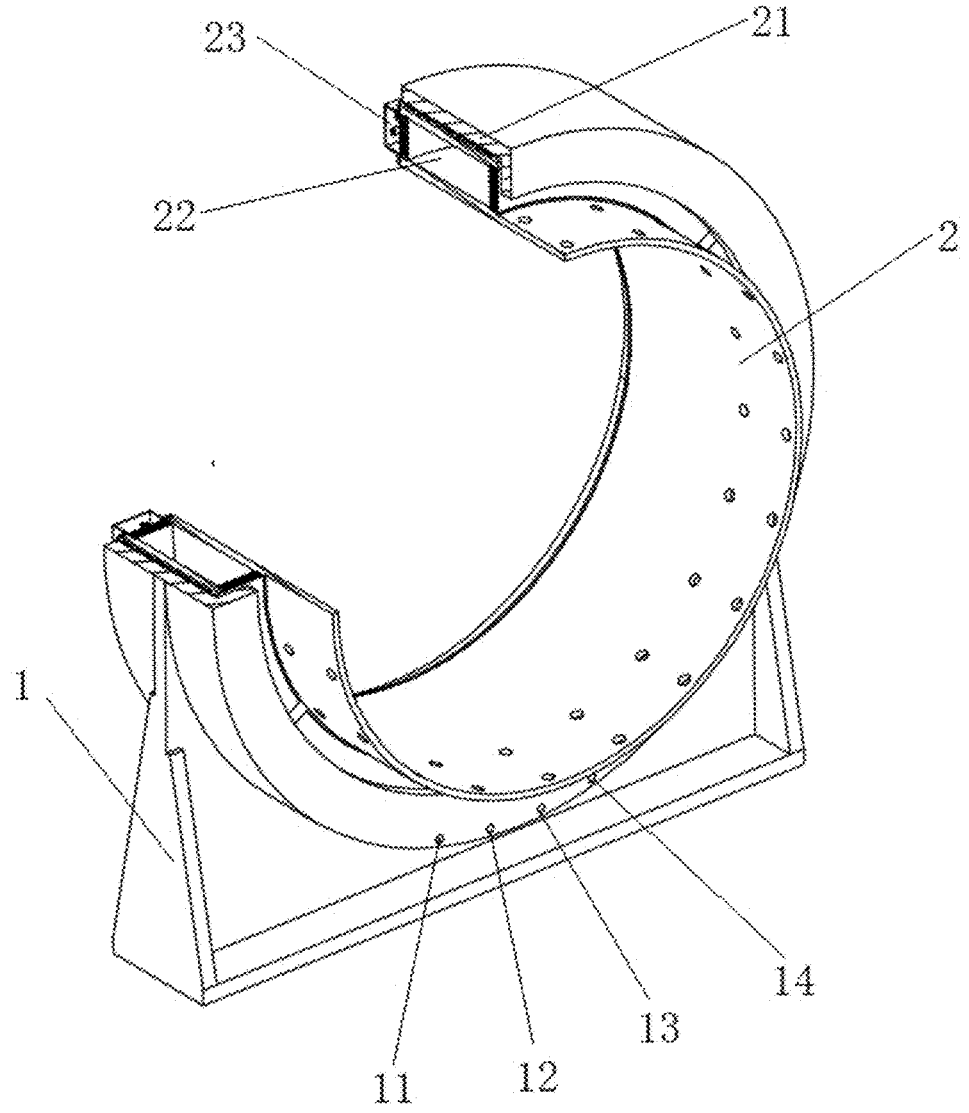
FIG. 2 shows a schematic structural diagram showing assembly of embodiment I of a pneumatic-liquid auto-balance actuator with a large diameter according to the present application.
Figure 3:
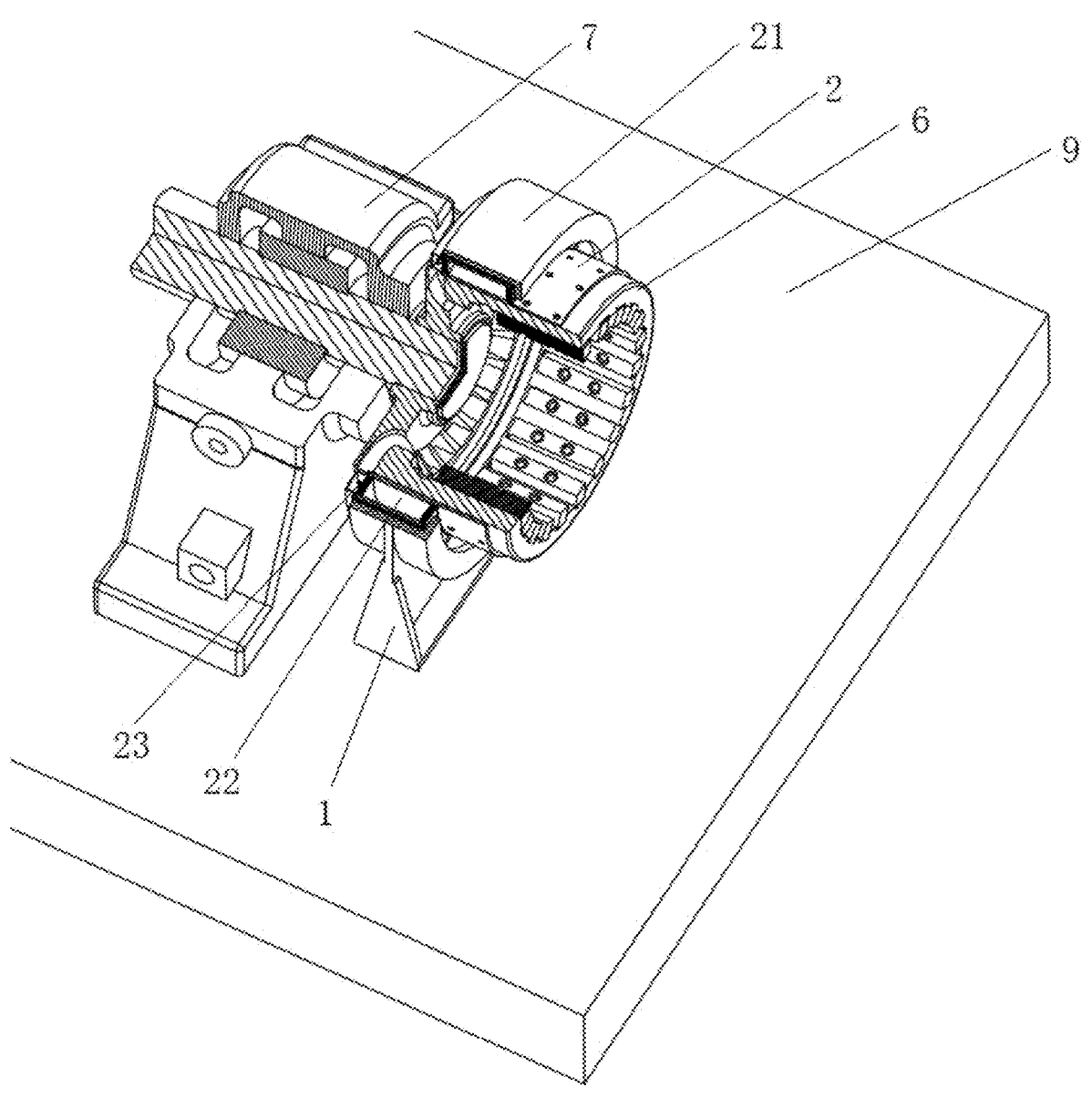
FIG. 3 is a schematic structural diagram showing an assembly example of embodiment I of a pneumatic-liquid auto-balance actuator with a large diameter according to the present application.
Figure 4:
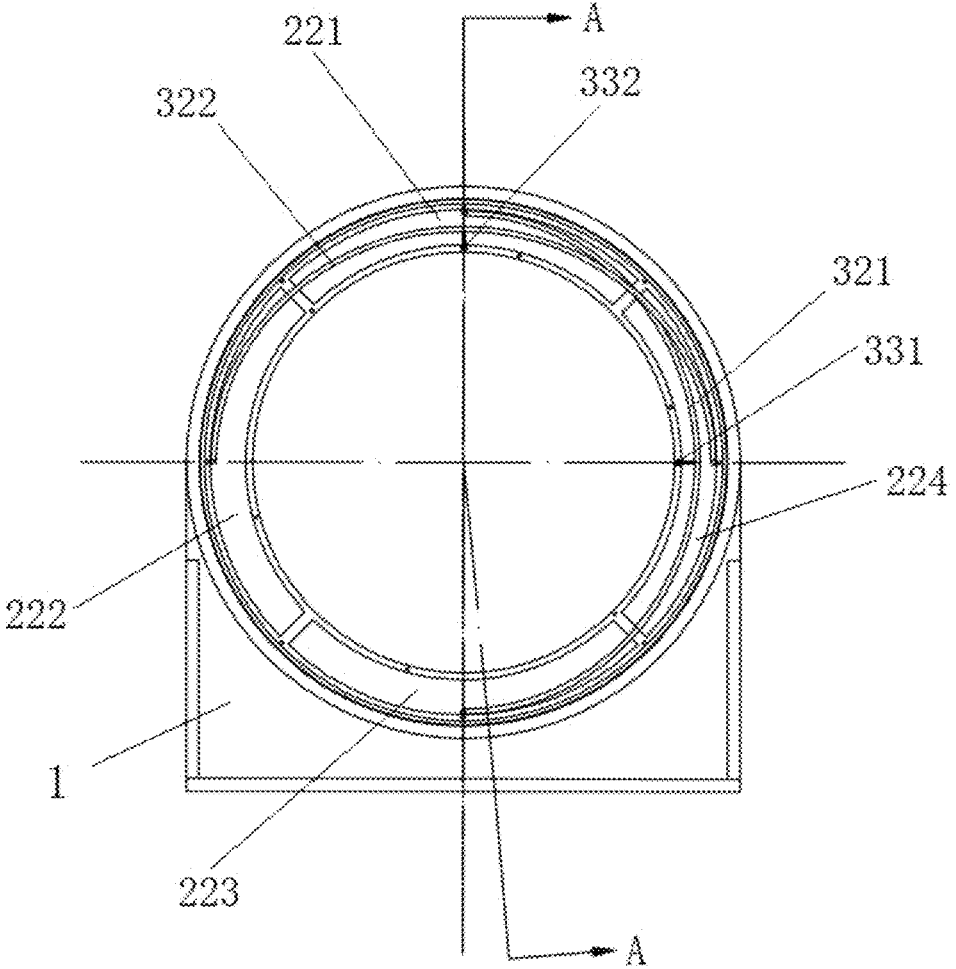
FIG. 4 is a schematic structural diagram showing an internal structure of a balance disk of embodiment I of a pneumatic-liquid auto-balance actuator with a large diameter according to the present application.
Figure 5:
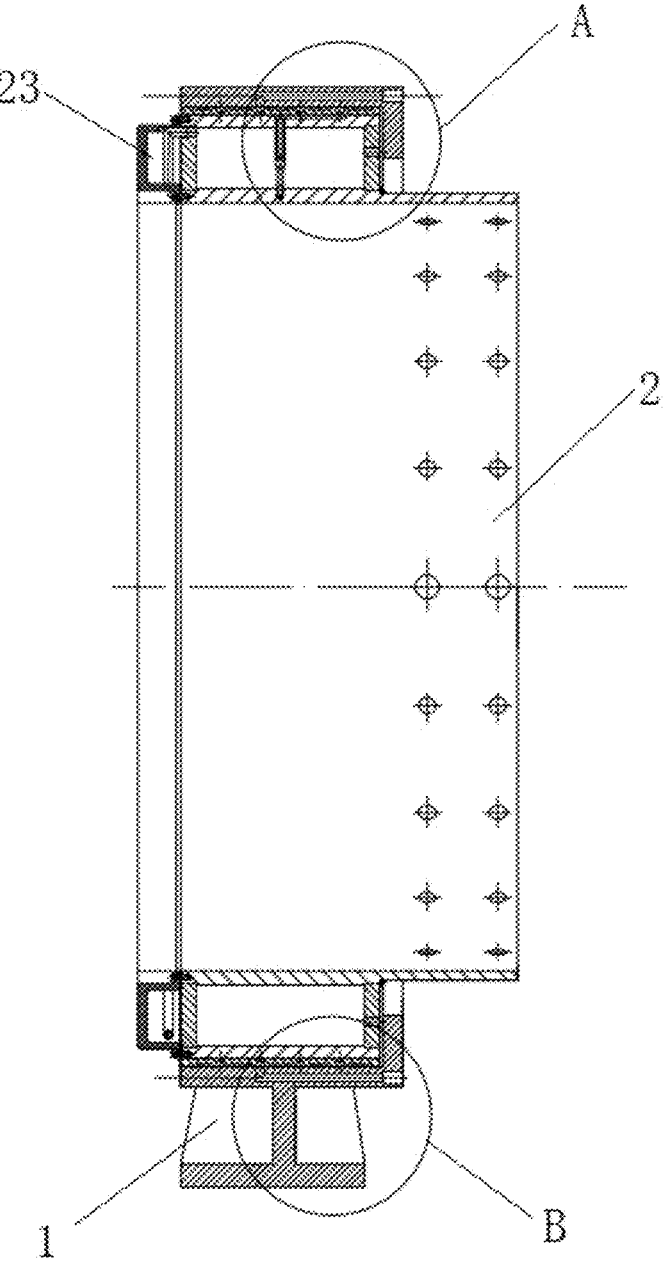
FIG. 5 shows a cross-sectional schematic structural diagram at the line A-A in FIG. 4 according to the present application.
Figure 6:
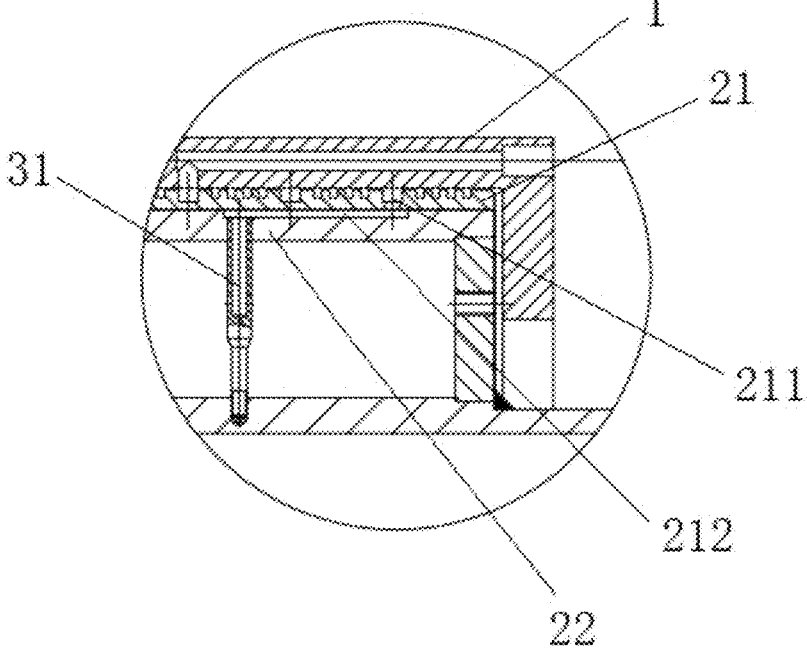
FIG. 6 is a partially enlarged schematic structural diagram showing the portion A in FIG. 5 according to the present application.
Figure 7:
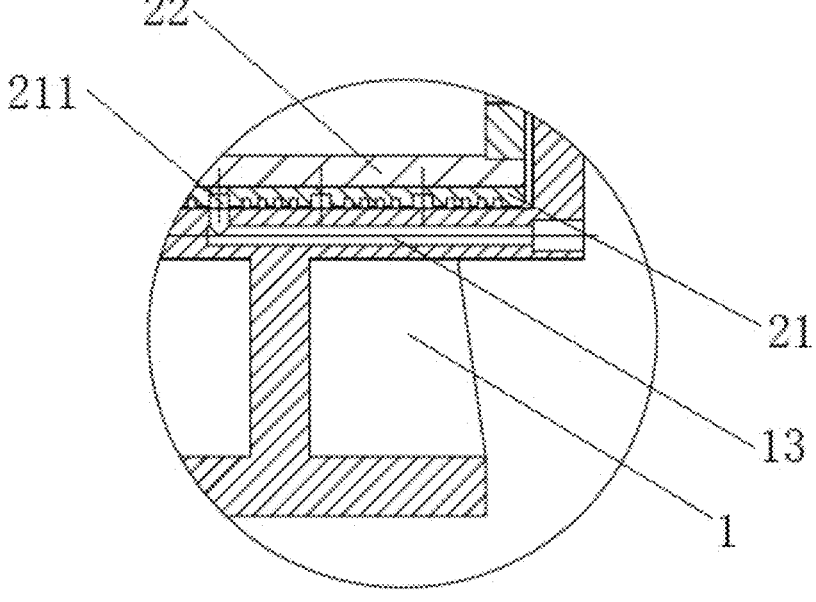
FIG. 7 is a partially enlarged schematic structural diagram showing the portion B in FIG. 5 according to the present application.

1—stator, 11—first gas injection channel, 11'—first gas inlet, 12—second gas injection channel, 12'—second gas inlet, 13—third gas injection channel, 13'—third gas inlet, 14—fourth gas injection channel, 14'—fourth gas inlet, 15—brush type sealing means, 2—balance disk, 21—intermediate sleeve, 211—gas circulation groove, 212—oblong groove, 22—liquid storage tray, 221—first liquid storage cavity, 222—second liquid storage cavity, 223—third liquid storage cavity, 224—fourth liquid storage cavity, 23—shield, 31—gas injection pipe, 321—first communication pipe, 322—second communication pipe, 331—first evacuation pipe, 332—second evacuation pipe, 4—gas circuit channel, 5—electromagnetic valve, 6—rotor to be balanced, 7—bearing, 8—gas source, 9—base.

Description of the Embodiments

Detailed description of the specific implementations of the present application will be provided below in conjunction with the accompanying drawings. It is to be understood, however, that the scope of the present invention is not limited to the preferred embodiments.

Throughout the description and the claims which follow, unless explicitly stated otherwise, the word "include", or variations such as "includes" or "including", will be understood to imply the inclusion of a stated element or group of elements but not the exclusion of any other element or component.

In this document, spatially relative terms, such as "under", "below", "lower", "on", "above", "upper", and the like, may be used for the convenience of description to describe the relationship between one element or feature and another element(s) or feature(s) in the figures. It will be understood that the spatially relative terms are intended to encompass different orientations of the article in use or operation in addition to the orientation depicted in the figures. For example, if the article in the figures is turned over, elements described as "below" or "under" other elements or features would then be oriented "above" said other elements or features. Thus, the exemplary term "below" can encompass directions of both below and above. The articles may also have other orientations (rotated 90 degrees or other orientations) and the spatially relative terms used herein should be interpreted accordingly.

Embodiment I

As shown in FIGS. 1-7, a pneumatic-liquid auto-balance actuator with a large diameter includes a stator 1 and a balance disk 2, where the stator 1 and a bearing 7 are fixedly provided on a base 9, the bearing 7 supports a rotor 6 to be balanced, the balance disk 2 is fixedly provided outside the rotor 6 to be balanced and rotates synchronously with the rotor 6 to be balanced, and the stator 1 is provided outside the balance disk 2. The stator 1 is fixedly provided on the base 9 of the apparatus by means of bolts, the balance disk 2 is connected to the rotor 6 to be balanced by means of bolts, and there is a certain clearance between the balance disk 2 and the stator 1 in the radial direction. The base 9 functions as a bearing 7 for fixing the stator 1 and the rotor 6 to be balanced, the bearing 7 acting as a support.

The balance disk 2 includes an intermediate sleeve 21, a liquid storage tray 22 and a shield 23, where the intermediate sleeve 21 is interference-sheathed on an outer side wall of the liquid storage tray 22, an outer side wall of the intermediate sleeve 21 is axially provided with four gas circulation grooves 211, the liquid storage tray 22 includes four liquid storage cavities which are uniformly distributed along the circumferential direction, an equal amount of balance liquid is initially provided in each of the liquid storage cavities, gas injection pipes 31 are provided in the liquid storage cavities and are respectively fixedly provided on outer side walls of the liquid storage cavities and are inserted into inner side walls of the liquid storage cavities, and the gas injection pipes 31 are in communication and connected with the gas circulation grooves 211. The intermediate sleeve 21 is thermally sheathed on the liquid storage tray 22 after the processing is completed, and is assembled into one body through the thermal sheathing.

A communication pipe is connected in communication between the liquid storage cavity and another liquid storage cavity provided opposite thereto, an evacuation pipe is connected in communication with the middle of the communication pipe, one end of the evacuation pipe is fixedly provided on the bottom surface of the liquid storage tray 22, the other end of the evacuation pipe is in communication with the atmosphere, the middle of the evacuation pipe is in communication and connected with the communication pipe, the communication pipe and an exhaust pipe are provided in a shield 23, and the shield is fixedly provided on the liquid storage tray 22. The communication pipe serves as a fluid channel for the transfer of the balance liquid, and the evacuation pipe serves to balance the pressure of two liquid storage cavities connected to the communication pipe so that it is equal to the external atmospheric pressure under the non-action state of the pneumatic-liquid balance actuator, so as to avoid that the pressure in a certain liquid storage cavity is greater than the atmospheric pressure due to multiple gas injection for balance, thus affecting the transfer of the balance liquid and thus affecting the balance effect. The shield 23 is bolted to the liquid storage tray 22 and functions to protect the communication pipe and the exhaust pipe from damage.

Four gas injection channels of different depths are axially provided at the bottom of the stator 1, and the gas injection channels are in one-to-one correspondence to the gas circulation grooves 211 of the outer side wall of the intermediate sleeve 21; and gas circuit channels are respectively connected outside the gas injection channels 4, and the gas circuit channels 4 are respectively in communication and connected with a gas source 8 via electromagnetic valves 5. The intermediate sleeve 21 is a dynamic-static transfer part to realize compressed gas injection from the stationary gas injection channel on the stator 1 to the internal liquid storage cavity of the liquid storage tray 22 rotating synchronously with the rotor 6 to be balanced.

The gas injection pipe 31 is provided at a central position in the axial direction and the circumferential direction of the liquid storage cavity, an outer surface of an outer wall of the liquid storage cavity is provided with an oblong groove 212, one end of the oblong groove 212 is connected to the bottom wall of the gas circulation groove 211, and the other end of the oblong groove 212 is connected to the top of the gas injection pipe 31. This arrangement of the gas injection pipe 31 makes the intake process more uniform, and the parameters such as the transfer speed in the liquid transfer process are consistent, but since the introduction of the gas from the gas circulation groove 211 into the gas injection pipe 31 through the oblong groove 212 increases the local resistance, such a configuration is suitable if the sealing requirement is low or the intake gas amount is demanded to be small.

The gas provided by the gas source 8 passes through four electromagnetic valves 5 and then passes through four gas circuit channels 4 and corresponding four gas injection channels with different depths on the stator 1; the four gas injection channels respectively correspond to four gas circulation grooves 211 on the intermediate sleeve 21 along the axial depth; the oblong grooves 212 at the bottoms of the four gas circulation grooves 211 respectively correspond to four gas injection pipes 31 in the four liquid storage cavities, forming four mutually independent gas circulation channels, i.e., the gas enters the four liquid storage cavities respectively through the oblong grooves 212 at the bottoms of the gas circulation grooves 211 of the intermediate sleeve 21 and the gas injection pipes 31.

A gas labyrinth seal groove is provided between the gas circulation grooves 211. The gas labyrinth seal groove divides the gas circulation groove 211 on the outer side wall of the intermediate sleeve 21 into independent gas channels which do not affect each other, so that the gases between the respective gas circulation grooves 211 are mutually independent and do not affect each other.

Specifically, the liquid storage tray 22 includes a first liquid storage cavity 221, a second liquid storage cavity 222, a third liquid storage cavity 223 and a fourth liquid storage cavity 224 which are uniformly distributed and successively provided, a first communication pipe 321 is in communication and connected between the first liquid storage cavity 221 and the third liquid storage cavity 223, a second communication pipe 322 is in communication and connected between the second liquid storage cavity 222 and the fourth liquid storage cavity 224, a first evacuation pipe 331 is in communication and connected with the middle of the first communication pipe 321, and a second evacuation pipe 332 is in communication and connected with the middle of the second communication pipe 322.

Specifically, the bottom of the stator 1 is axially provided with a first gas injection channel 11, a second gas injection channel 12, a third gas injection channel 13 and a fourth gas injection channel 14 with different depths, where the first gas injection channel 11, the second gas injection channel 12, the third gas injection channel 13 and the fourth gas injection channel 14 are in one-to-one correspondence to the four gas circulation grooves 211 of the outer side wall of the intermediate sleeve 21.

The pneumatic-liquid auto-balance actuator with a large diameter in the present embodiment is used for real-time dynamic balancing of the rotor 6 to be balanced; in an initial state, an equal amount of balancing liquid is contained in each of the first liquid storage cavity 221, the second liquid storage cavity 222, the third liquid storage cavity 223 and the fourth liquid storage cavity 224; the balance disk 2 is in a balanced state; and if the rotor 6 to be balanced operates normally at this moment, the actuator does not operate and does not affect the current balancing state of the rotor 6 to be balanced. When the vibration exceeds the standard during the operation of the apparatus, a vibration sensor and a rotation speed sensor provided on the bearing 7 and the rotor 6 to be balanced input a vibration signal and a rotation speed signal into the measurement and control device; the measurement and control device analyzes and processes the signal to determine that the vibration of the rotor 6 to be balanced exceeds the standard, calculates the magnitude and phase of the imbalance amount (for example, if it is necessary to transfer the balance liquid to the third liquid storage cavity 223 and the fourth liquid storage cavity 224), and outputs a control instruction to open the electromagnetic valve 5, so that the compressed gas from the gas source 8 passes through the electromagnetic valve (the energization durations of the electromagnetic valve 5 are t221 and t222 respectively), the gas circuit channel 4 and the first gas injection channel 11 and the second gas injection channel 12 on the stator 1, the corresponding gas circulation grooves 211 on the intermediate sleeve 21, the oblong grooves 212 and the gas injection pipes 31, and reaches the first liquid storage cavity 221 and the second liquid storage cavity 222; the liquid in the liquid storage cavity is driven by the compressed gas, so that the balance liquid in the first liquid storage cavity 221 is transferred to the third liquid storage cavity 223 along the communication pipe 321, and the balance liquid in the second liquid storage cavity 222 is transferred to the fourth liquid storage cavity 224 along the communication pipe 322 (the amount of transferred balance liquid is determined by the energization durations t221 and t222 of the electromagnetic valve). Then, the mass of the balance disk is redistributed, the rotor 6 to be balanced returns to the normal operation state, the measurement and control device determines that the state is normal by monitoring and displays the normal state, the electromagnetic valve 5 is disconnected to stop the balance liquid transferring, and the balance process ends.

Embodiment II

Figure 8:
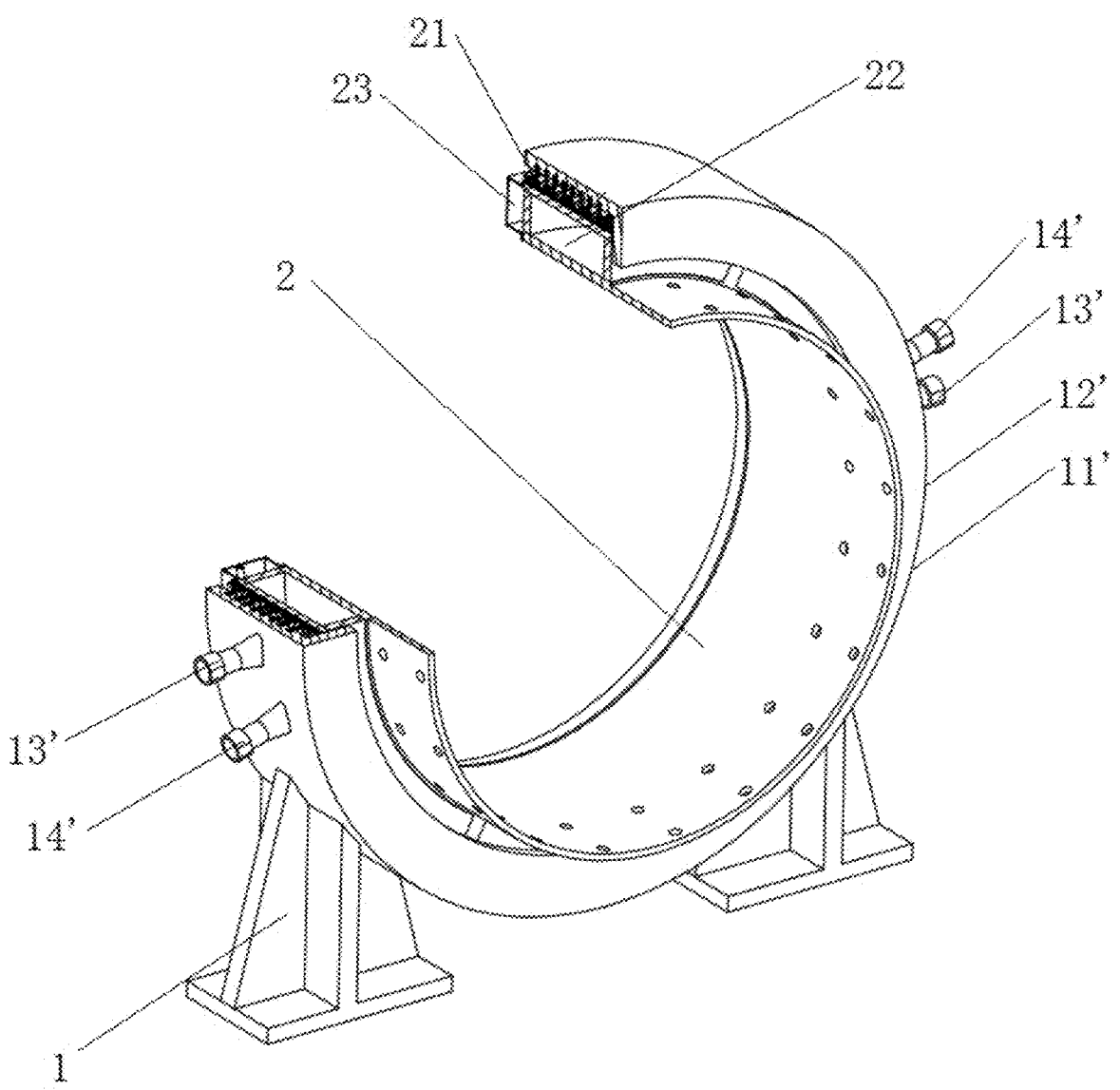
FIG. 8 is a schematic structural diagram showing embodiment II of a pneumatic-liquid auto-balance actuator with a large diameter according to the present application.
Figure 9:
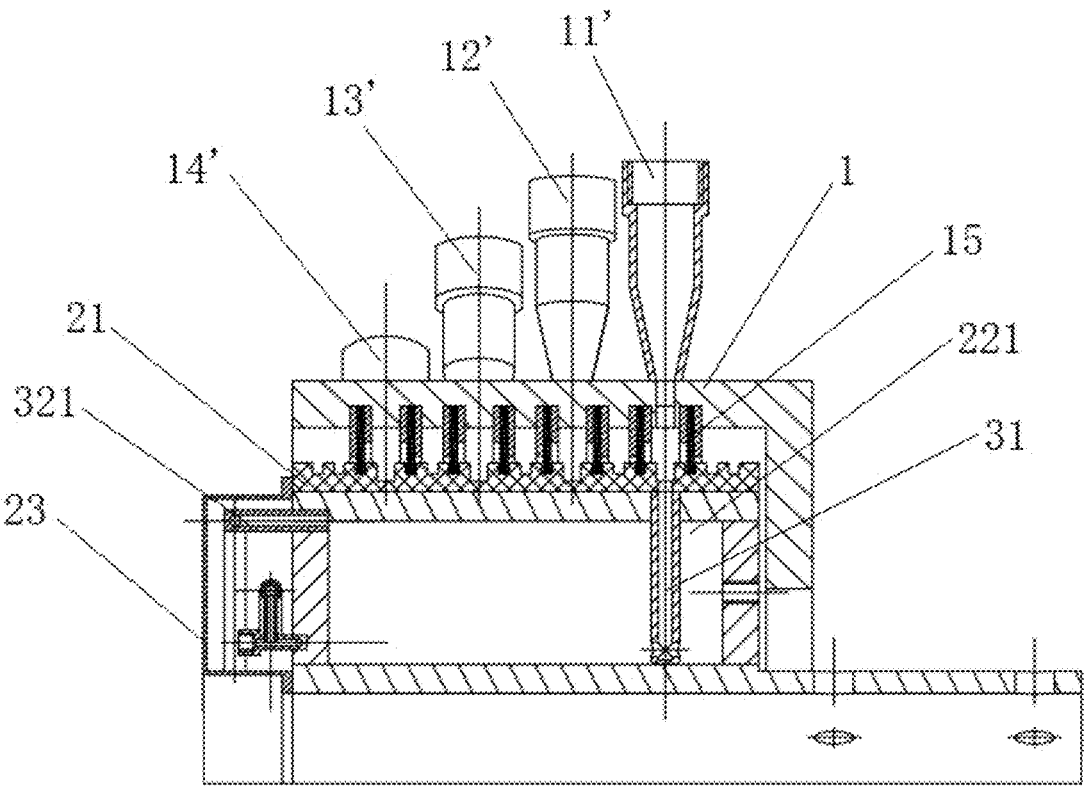
FIG. 9 is a cross-sectional schematic structural diagram of a first liquid storage cavity of embodiment II of a pneumatic-liquid auto-balance actuator with a large diameter according to the present application.

As shown in FIGS. 8 and 9, a pneumatic-liquid auto-balance actuator with a large diameter is provided, which differs from Embodiment I in a gas inlet manner and a sealing manner. Specifically, four pairs of gas inlets are provided on the outer side wall of the stator 1, the axial positions of each pair of the gas inlets are the same and are centrally symmetrical around the rotating shaft, and each pair of gas inlets are in one-to-one correspondence to the gas circulation grooves 211 of the outer side wall of the intermediate sleeve 21; gas circuit channels 4 are respectively connected outside the gas inlets, and the gas circuit channels 4 are respectively in communication and connected with a gas source 8 via electromagnetic valves 5.

The gas injection pipe 31 is provided at the circumferential center of the liquid storage cavity and axially at a position corresponding to the gas circulation groove 211, and the bottom of the gas circulation groove 211 is provided with a through hole corresponding to the gas injection pipe 31. This arrangement of the gas injection pipe 31 adopts a structure in which the gas circulation groove 211 is in direct communication with the gas injection pipe 31, which improves the gas injection effect and reduces the local resistance caused by the oblong groove 212 structure. It is applicable to the case where the intake gas amount is demanded to be great, and the intake effect can be greatly increased.

The gas provided by the gas source 8 passes through four electromagnetic valves 5 and then passes through four gas circuit channels 4 and corresponding four pairs of gas inlets of the stator 1; the four pairs of gas inlets respectively correspond to four gas circulation grooves 211 on the intermediate sleeve 21; the oblong grooves 212 at the bottoms of the four gas circulation grooves 211 respectively correspond to four gas injection pipes 31 in the four liquid storage cavities, forming four mutually independent gas circulation channels, i.e., the gas enters the four liquid storage cavities respectively through the oblong grooves 212 at the bottoms of the gas circulation grooves 211 of the intermediate sleeve 21 and the gas injection pipes 31.

Brush type sealing means 15 are provided on both sides of the gas circulation groove 211, the brush type sealing means including a front plate, a rear plate and a brush tow. The brush type sealing means 15 is welded on the inner side of the stator 1 in four pairs, two in each pair, correspondingly mounted at two sides of the four gas circulation grooves 211 on the intermediate sleeve 21. The brush type sealing means 15 divides the gas circulation groove 211 on the outer side wall of the intermediate sleeve 21 into independent gas channels which do not affect each other, so that the gases between the respective gas circulation grooves 211 are mutually independent and do not affect each other.

Specifically, a first gas inlet 11', a second gas inlet 12', a third gas inlet 13' and a fourth gas inlet 14' are provided on the outer side wall of the stator 1, each pair of the first gas inlets 11', the second gas inlets 12', the third gas inlets 13' and the fourth gas inlets 14' having the same axial position and being centrally symmetrical around the rotating shaft, and each pair of the first gas inlets 11', the second gas inlets 12', the third gas inlets 13' and the fourth gas inlets 14' are in one-to-one correspondence to the gas circulation grooves 211 of the outer side wall of the intermediate sleeve 21.

The pneumatic-liquid auto-balance actuator with a large diameter of the present embodiment is used for real-time dynamic balancing of the rotor 6 to be balanced, which is basically the same as the embodiment I. In an initial state, an equal amount of balancing liquid is contained in each of the first liquid storage cavity 221, the second liquid storage cavity 222, the third liquid storage cavity 223 and the fourth liquid storage cavity 224; the balance disk 2 is in a balanced state; and if the rotor 6 to be balanced operates normally at this moment, the actuator does not operate and does not affect the current balancing state of the rotor 6 to be balanced. When the vibration exceeds the standard during the operation of the apparatus, a vibration sensor and a rotation speed sensor provided on the bearing 7 and the rotor 6 to be balanced input a vibration signal and a rotation speed signal into the measurement and control device; the measurement and control device analyzes and processes the signal to determine that the vibration of the rotor 6 to be balanced exceeds the standard, calculates the magnitude and phase of the imbalance amount (for example, if it is necessary to transfer the balance liquid to the third liquid storage cavity 223 and the fourth liquid storage cavity 224), and outputs a control instruction to open the electromagnetic valve 5, so that the compressed gas from the gas source 8 passes through the electromagnetic valve (the energization durations of the electromagnetic valve 5 are t221 and t222 respectively), the first gas inlet 11' and the second gas inlet 12' on the stator 1, the corresponding gas circulation groove 211 on the intermediate sleeve 21, and the gas injection pipe 31, and reaches the first liquid storage cavity 221 and the second liquid storage cavity 222; the liquid in the liquid storage cavity is driven by the compressed gas, so that the balance liquid in the first liquid storage cavity 221 is transferred to the third liquid storage cavity 223 along the communication pipe 321, and the balance liquid in the second liquid storage cavity 222 is transferred to the fourth liquid storage cavity 224 along the communication pipe 322 (the amount of transferred balance liquid is determined by the energization durations t221 and t222 of the electromagnetic valve). Then, the mass of the balance disk is redistributed, the rotor 6 to be balanced returns to the normal operation state, the measurement and control device determines that the state is normal by monitoring and displays the normal state, the electromagnetic valve 5 is disconnected to stop the balance liquid transferring, and the balance process ends.

The foregoing description of specific exemplary embodiments of the present application has been presented for purposes of illustration and example. It is not intended to limit the present application to the precise form disclosed, and obviously many modifications and variations are possible considering the above teaching. The exemplary embodiments were chosen and described to explain the specific principles of the present application and its practical application to enable a person skilled in the art to make and use the various exemplary embodiments of the present application and various alternatives and modifications thereof. Any simple modifications, equivalent variations and modifications to the exemplary embodiments described above are intended to fall within the scope of the present application.

INDUSTRIAL APPLICABILITY

The present application relates to a pneumatic-liquid auto-balance actuator with a large diameter. An intermediate sleeve is interference-sheathed on an outer side wall of a liquid storage tray, an outer side wall of the intermediate sleeve is axially provided with four gas circulation grooves. The bottom of a stator is axially provided with four gas injection channels, which are of unequal depths and are in one-to-one correspondence to the gas circulation grooves. In the present application, due to the use of the above-mentioned technical solution, during an operation process, there is no liquid injection and liquid discharging steps, the on-off time of the electromagnetic valves is controlled by a measurement and control device, and compressed gas is injected to drive balance liquids of a fixed amount to be mutually transferred between the opposite liquid storage cavities, and two pairs of mutually orthogonal liquid storage cavities obtain by vector synthesis a compensation vector equal in magnitude and opposite in direction to the imbalance amount to offset the imbalance.

What is claimed is:

1. A pneumatic-liquid auto-balance actuator, comprising a stator and a balance disk, wherein the stator and a bearing are fixedly provided on a base, the bearing supports a rotor to be balanced, the balance disk is fixedly provided outside the rotor to be balanced and rotates synchronously with the rotor to be balanced, and the stator is provided outside the balance disk; and the balance disk comprises an intermediate sleeve, a liquid storage tray and a shield, wherein the intermediate sleeve is interference-sheathed on an outer side wall of the liquid storage tray, an outer side wall of the intermediate sleeve is axially provided with four gas circulation grooves, the liquid storage tray comprises four liquid storage cavities which are uniformly distributed along a circumferential direction, an equal amount of balance liquid is initially provided in each of the liquid storage cavities, gas injection pipes are provided in the liquid storage cavities and are respectively fixedly provided on outer side walls of the liquid storage cavities and are inserted into inner side walls of the liquid storage cavities, and the gas injection pipes are in communication and connected with the gas circulation grooves; and a communication pipe is in communication and connected between the liquid storage cavity and another liquid storage cavity provided opposite thereto, an evacuation pipe is in communication and connected with the middle of the communication pipe, one end of the evacuation pipe is fixedly provided on a bottom surface of the liquid storage tray, the other end of the evacuation pipe is in communication with the atmosphere, the middle of the evacuation pipe is in communication and connected with the communication pipe, the communication pipe and an exhaust pipe are provided in a shield, and the shield is fixedly provided on the liquid storage tray.

2. The pneumatic-liquid auto-balance actuator according to claim 1, wherein four gas injection channels of different depths are axially provided at the bottom of the stator, and the gas injection channels are in one-to-one correspondence to the gas circulation grooves on the outer side wall of the intermediate sleeve; and gas circuit channels are respectively connected outside the gas injection channels, and the gas circuit channels are respectively in communication and connected with a gas source via electromagnetic valves.

3. The pneumatic-liquid auto-balance actuator according to claim 2, wherein the gas injection pipe is provided at a central position in an axial direction and a circumferential direction of the liquid storage cavity, an outer surface of the outer wall of the liquid storage cavity is provided with an oblong groove, one end of the oblong groove is connected to a bottom wall of the gas circulation groove, and the other end of the oblong groove is connected to the top of the gas injection pipe.

4. The pneumatic-liquid auto-balance actuator according to claim 3, wherein gas labyrinth seal grooves are provided between the gas circulation grooves.

5. The pneumatic-liquid auto-balance actuator according to claim 1, wherein four pairs of gas inlets are provided on an outer side wall of the stator, the axial positions of each pair of the gas inlets are the same and are centrally symmetrical around a rotating shaft, and each pair of the gas inlets are in one-to-one correspondence to the gas circulation grooves of the outer side wall of the intermediate sleeve; and gas circuit channels are respectively connected outside the gas inlets, and the gas circuit channels are respectively in communication and connected with a gas source via electromagnetic valves.

6. The pneumatic-liquid auto-balance actuator according to claim 5, wherein the gas injection pipe is provided at a circumferential center of the liquid storage cavity and axially at a position corresponding to the gas circulation groove, and a through hole corresponding to the gas injection pipe is provided at the bottom of the gas circulation groove.

7. The pneumatic-liquid auto-balance actuator according to claim 6, wherein brush sealing means are provided on both sides of the gas circulation groove, the brush sealing means comprising a front plate, a rear plate and a brush tow.

8. The pneumatic-liquid auto-balance actuator according to claim 1, wherein the liquid storage tray comprises a first liquid storage cavity, a second liquid storage cavity, a third liquid storage cavity and a fourth liquid storage cavity which are uniformly distributed and successively provided, a first communication pipe is in communication and connected between the first liquid storage cavity and the third liquid storage cavity, and a second communication pipe is in communication and connected between the second liquid storage cavity and the fourth liquid storage cavity; a first evacuation pipe is in communication and connected with the middle of the first communication pipe, and a second evacuation pipe is in communication and connected with the middle of the second communication pipe.

9. The pneumatic-liquid auto-balance actuator according to claim 2, wherein the bottom of the stator is axially provided with a first gas injection channel, a second gas injection channel, a third gas injection channel and a fourth gas injection channel with different depths, wherein the first gas injection channel, the second gas injection channel, the third gas injection channel and the fourth gas injection channel are respectively in one-to-one correspondence to the four gas circulation grooves of the outer side wall of the intermediate sleeve.

10. The pneumatic-liquid auto-balance actuator according to claim 5, wherein a first gas inlet, a second gas inlet, a third gas inlet and a fourth gas inlet are provided on the outer side wall of the stator, each pair of the first gas inlets, the second gas inlets, the third gas inlets and the fourth gas inlets having the same axial position and being centrally symmetrical around the rotating shaft, each pair of the first gas inlets, the second gas inlets, the third gas inlets and the fourth gas inlets are in one-to-one correspondence to the gas circulation grooves of the outer side wall of the intermediate sleeve.

\* \* \* \* \*